F. M. PEDEN.
DOUBLE ROW STALK CUTTER.
APPLICATION FILED JUNE 12, 1908.
921,448.
Patented May 11, 1909.
2 SHEETS—SHEET 1.
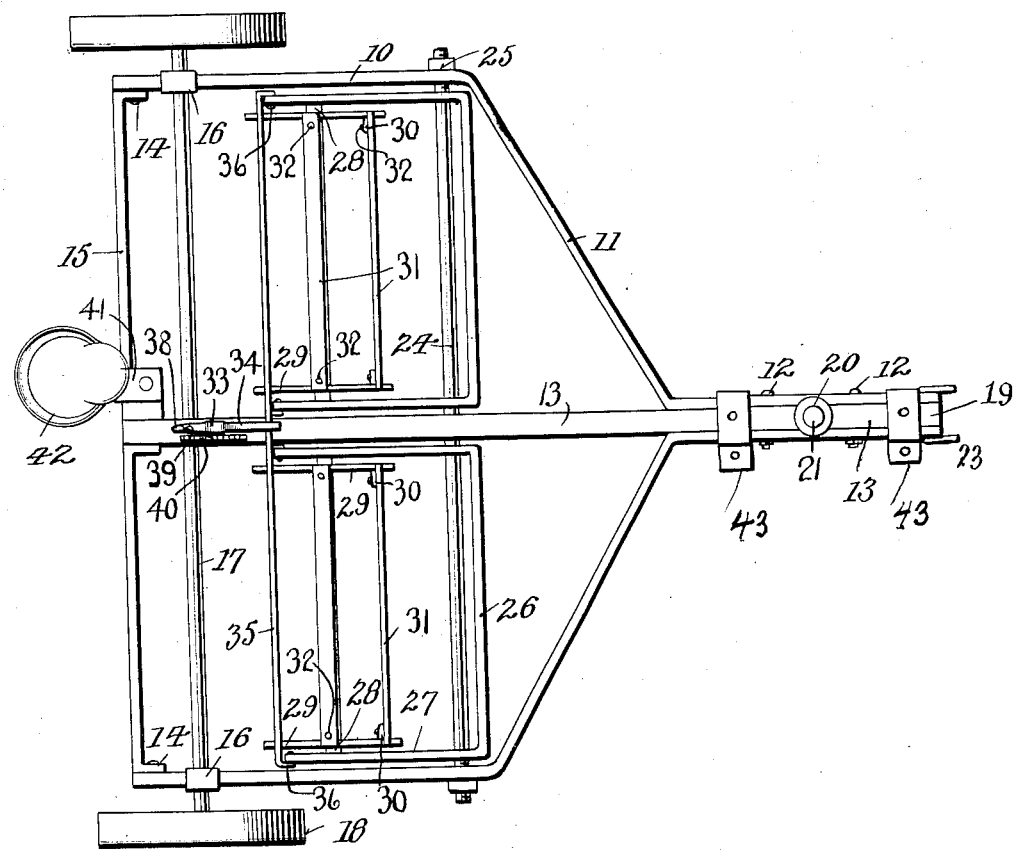
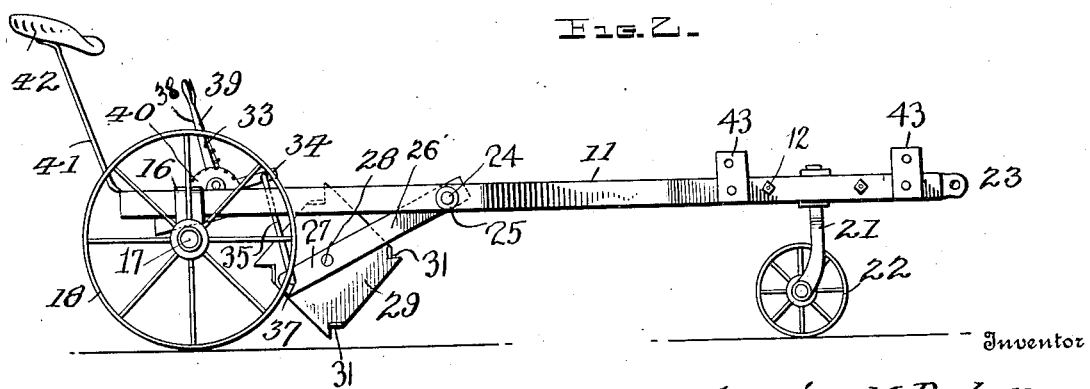
Witnesses
Inventor
Francis M. Peden
By Chandler & Chandler
Attorneys

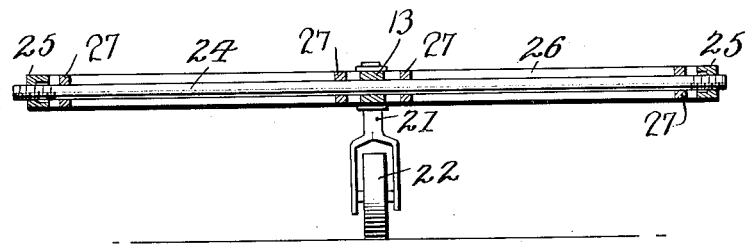
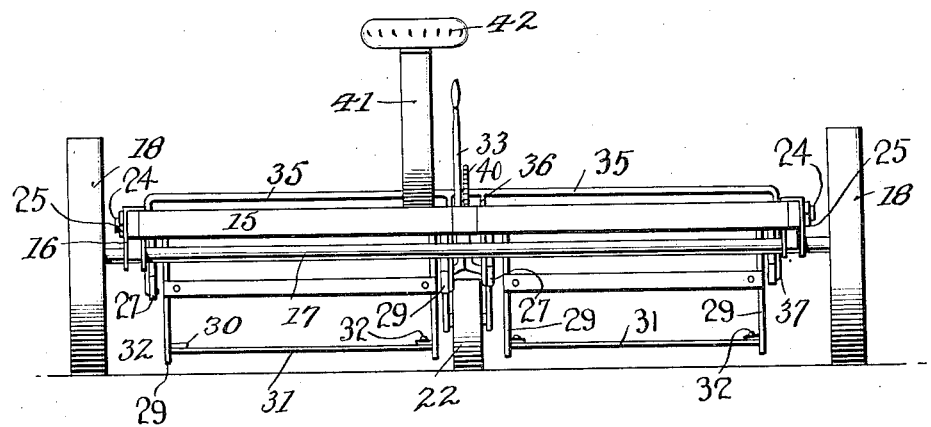
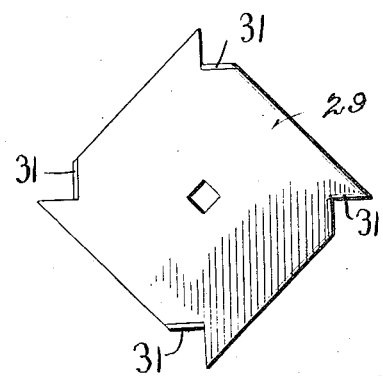

UNITED STATES PATENT OFFICE.

FRANCIS M. PEDEN, OF NEWARK, TEXAS.

DOUBLE-ROW STALK-CUTTER.

No. 921,448.

Specification of Letters Patent.

Patented May 11, 1909.

Application filed June 12, 1908. Serial No. 438,199.

*To all whom it may concern:*

Be it known that I, FRANCIS M. PEDEN, a citizen of the United States, residing at Newark, in the county of Wise, State of Texas, have invented certain new and useful Improvements in Double-Row Stalk-Cutters; and I do hereby declare the following to be a full, clear, and exact description of the invention, such as will enable others skilled in the art to which it appertains to make and use the same.

The invention relates to a stalk cutter and more particularly to the class of wheeled double row stalk cutting machines.

The primary object of the invention is the provision of an implement for cutting or chopping stalk and includes a wheeled frame having vertically adjustable sections mounted therein and supporting rotatable stalk cutters, the said sections adapted to be raised and lowered vertically by manually operable means whereby the stalk cutters are regulated with respect to the ground.

Another object of the invention is the provision of an implement of this class which will possess superior advantages in point of simplicity, durability and general efficiency.

With these and other objects in view the invention consists in the construction, combination and arrangement of parts as will be hereinafter more fully described and as illustrated in the accompanying drawings which disclose the preferred embodiment of the invention, it being however, understood that changes, alterations and modifications may be made within the scope of the invention such as come properly within the terms of the appended claim without departing from the spirit of the invention.

In the drawings;—Figure 1 is a top plan view of a machine constructed in accordance with the invention. Fig. 2 is a side elevation of the same. Fig. 3 is an end view of one of the stalk cutters. Fig. 4 is a transverse horizontal sectional view of the machine. Fig. 5 is a rear end view of the machine.

Similar reference characters indicate corresponding parts throughout the several views in the drawings.

In the drawings is shown, the frame of the implement or machine including side bars 10 each bent on itself to form an angularly disposed front portion 11 which portions are connected by a bolt fastener 12 to opposite sides of a central bar 13 and to the rear extremity of the latter and also to the rear ends of the side bars 10 are connected by bolt fasteners 14 the bent extremities of end bars 15 which latter prevent the spreading of said side bars and also serve to center the bar 13 extending across the middle of the frame.

To the side bars 10 are secured adjustable brackets forming bearings 16 in which is journaled an axle 17 having mounted thereon at opposite ends the usual transporting wheels 18. To the forwardly extending portion 19 of the central bar 13 is swiveled as at 20 the standard 21 of a ground wheel 22 whereby the implement or machine may be guided at its front. At the extreme end of the extension 19 there is a perforated head 23 for the attachment of the draft animals.

Extending across the frame near the front thereof and passing through the side bars 10 and center bar 13 is a rod or shaft 24 having at its extremities tap nuts 25 to hold the same securely in the frame and which rod forms a pivotal connection for vertically swinging frames or sections 26 each of which is substantially U-shape and disposed on one side of the center bar 13 and within the side bars 10 and which frame or section includes parallel alining arms 27 spaced from each other and into which are journaled shafts 28 which are rotatably supported therein.

Fixed to each shaft 28 are spaced end plates 29 of substantially square formation and cut from opposite corners of each of these plates are inwardly extending lugs or ears 30 to which are secured stalk cutters or blades 31 by bolt fasteners 32 to form a unitary structure for cutting stalks. To the central bar 13 is fulcrumed a bell-crank lever 33 having an outwardly extending short arm 34 the free end of which is connected to a coupling member 35 having short arms or extensions 36 the free ends of which are pivoted as at 37 to the free ends of the sections 26 whereby the latter may be raised or lowered in the main frame of the implement so as to vary the position of the stalk cutters with respect to the ground.

The upwardly extending arm 38 of the bell crank lever is provided with a spring actuated stop member 39 of the ordinary construction and engaging a segment rack 40 which is supported by and secured to the center bar of the frame. In rear of the segment rack 40 and secured to the center bar is a seat standard 41 having the usual seat 42 on the implement frame.

Carried by the extension 19 are laterally projecting clamp members 43 whereby a tongue may be secured in position on said extension if found desirable.

What is claimed is—

An implement of the class described comprising a main draft beam, side bars spaced from the main draft beam on the opposite sides thereof and having forward angularly disposed portions secured to the draft beam, cross bars united to the side bars and said draft beam at the rear ends thereof, a guide wheel swiveled at the forward end of the draft beam, an axle, wheels journaled on said axle, clip means adjustably connecting the axle to the side bars, swinging sections pivotally connected on opposite sides of the draft beam between the same and the side bars, shafts journaled in said swinging sections, spaced end plates secured to said shafts and having inwardly extending lugs at opposite corners thereof, cutter blades secured to said lugs, a bell crank lever, connections between the bell crank lever and the sections to raise and lower the latter, and means for locking the bell crank lever to maintain the sections in adjusted position.

In testimony whereof, I affix my signature, in presence of two witnesses.

FRANCIS M. PEDEN.

Witnesses:
J. T. WILLIAMS,
BERT HAKETT.